United States Patent [19]

Ridenour

[11] Patent Number: 5,607,194
[45] Date of Patent: Mar. 4, 1997

[54] MEMBER AND TUBE ASSEMBLY

[75] Inventor: Ralph G. Ridenour, Mansfield, Ohio

[73] Assignee: Universal Enterprises, Inc., Mansfield, Ohio

[21] Appl. No.: 426,496

[22] Filed: Apr. 20, 1995

[51] Int. Cl.⁶ .................................................. F16L 25/00
[52] U.S. Cl. ................................. 285/334.5; 285/382.4; 285/906
[58] Field of Search .............................. 285/382.4, 382.5, 285/334.5, 906

[56] References Cited

U.S. PATENT DOCUMENTS

| | | | |
|---|---|---|---|
| 609,030 | 8/1898 | Keller | 285/382.5 |
| 1,307,537 | 6/1919 | Cole | 285/334.5 X |
| 1,738,915 | 12/1929 | Mueller | 285/382.4 X |
| 1,802,538 | 4/1931 | Rych | 285/382.5 X |
| 1,858,136 | 5/1932 | Brenner | 285/334.5 X |
| 1,923,546 | 8/1933 | Lindemann et al. | 285/382.5 X |
| 1,961,453 | 6/1934 | Quarnstrom | 285/334.5 |
| 2,447,900 | 8/1948 | Crawley . | |
| 2,463,883 | 3/1949 | Kinsey . | |
| 2,497,273 | 2/1950 | Richardson . | |
| 2,545,168 | 3/1951 | Richardson . | |
| 3,497,946 | 3/1970 | Tingley . | |
| 3,778,090 | 12/1973 | Tobin . | |
| 3,930,298 | 1/1976 | Ridenour . | |
| 4,076,280 | 2/1978 | Young . | |
| 4,330,144 | 5/1982 | Ridenour | 285/382.5 |
| 4,453,301 | 6/1984 | Mettal . | |
| 4,537,320 | 8/1985 | Nielsen | 285/382.4 X |
| 4,575,134 | 3/1986 | Sugano . | |
| 4,669,761 | 6/1987 | Huling . | |
| 4,671,545 | 6/1987 | Miyazaki | 285/382.5 X |
| 4,765,661 | 8/1988 | Fukushima et al. . | |
| 4,805,945 | 2/1989 | Foucault et al. . | |
| 5,297,827 | 3/1994 | Choi . | |

*Primary Examiner*—Dave W. Arola
*Attorney, Agent, or Firm*—Pearne, Gordon, McCoy & Granger

[57] ABSTRACT

A tube and fitting assembly is made by the method of relatively moving a tube into an internal bore in a fitting with the internal bore extending end-to-end in the fitting, longitudinally compressing the tube to radially expand it into engagement with the wall of the internal bore, internally threading either the tube or the fitting and with the threads being adapted to receive a second member until it is sealed fluid-tight against the tube and there is therefore no need for a fluid-tight seal between the tube and the first fitting.

10 Claims, 3 Drawing Sheets

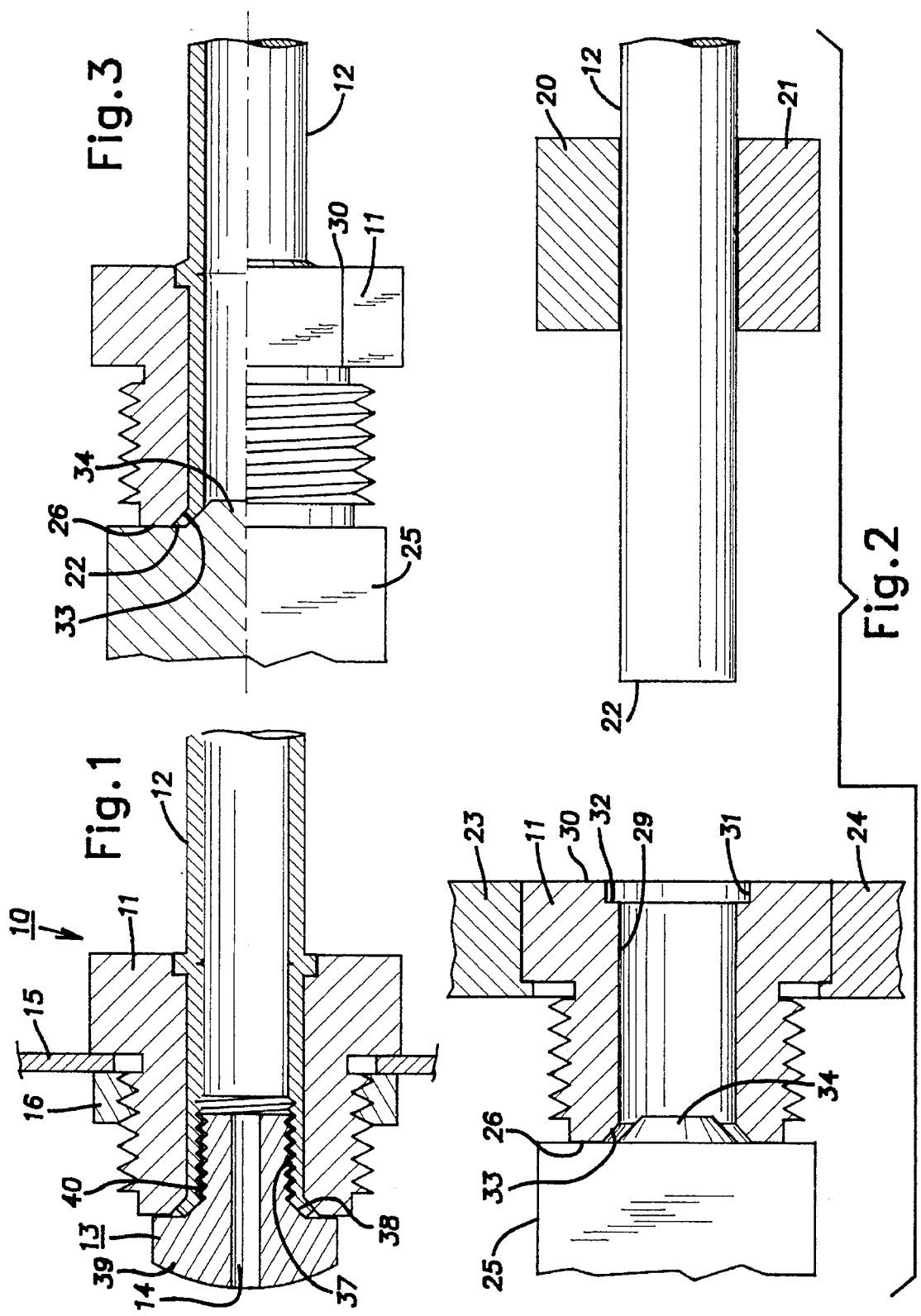

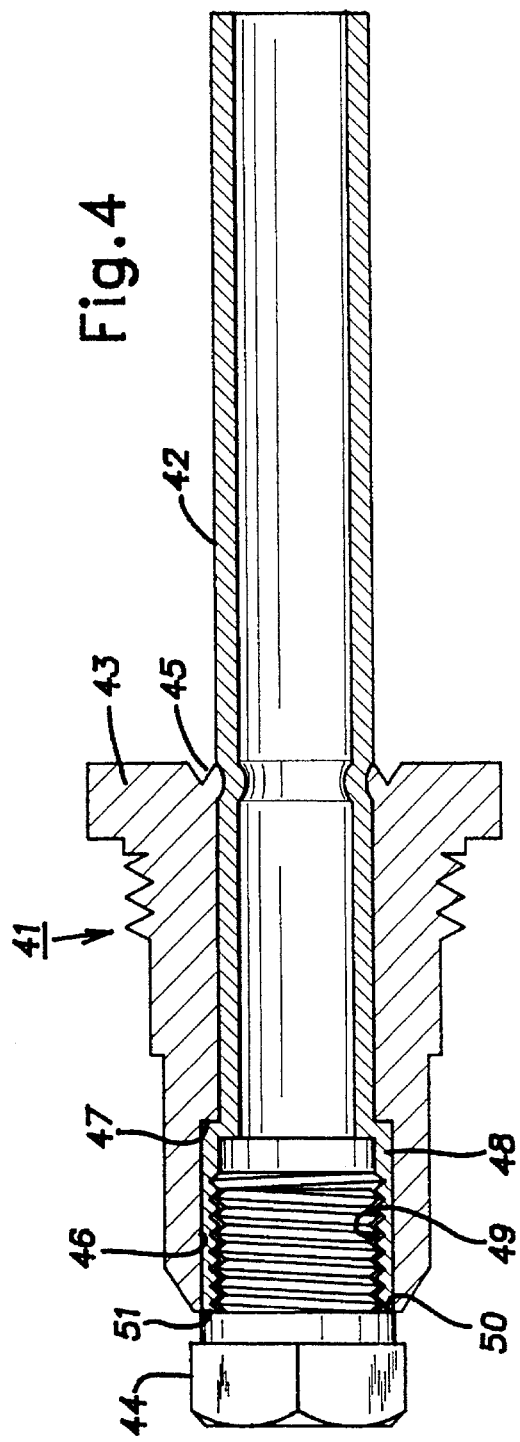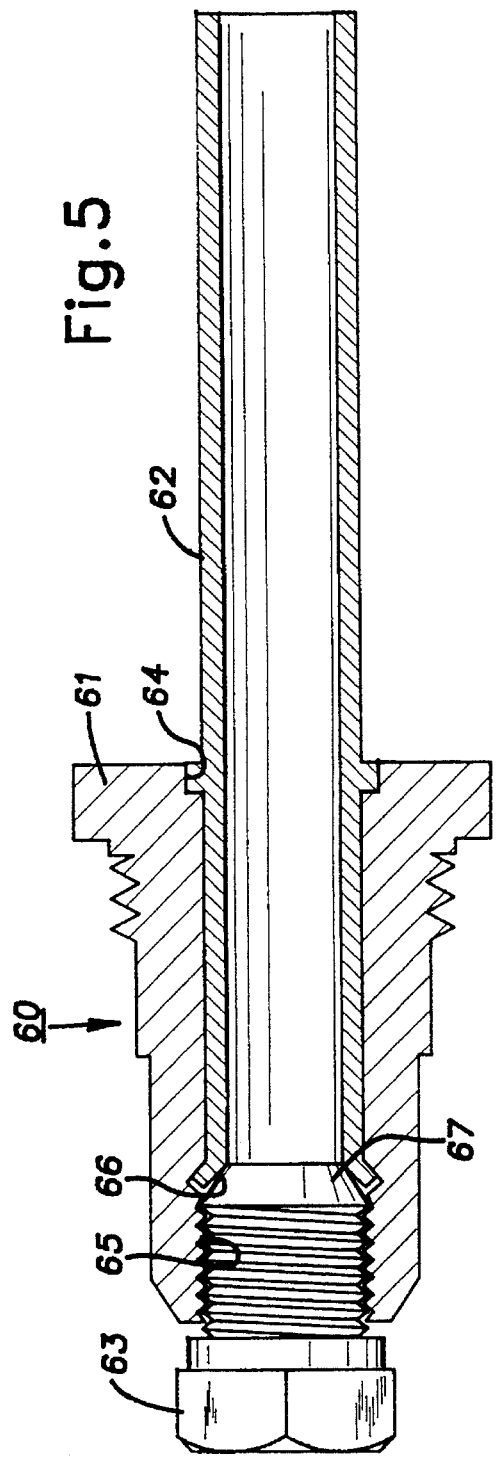

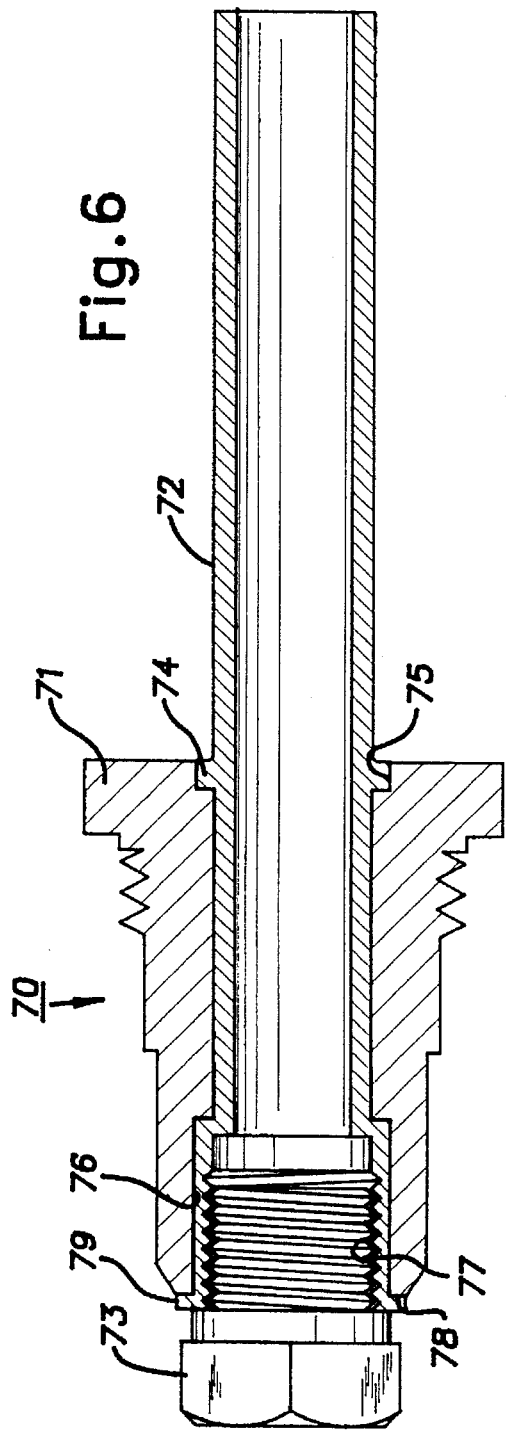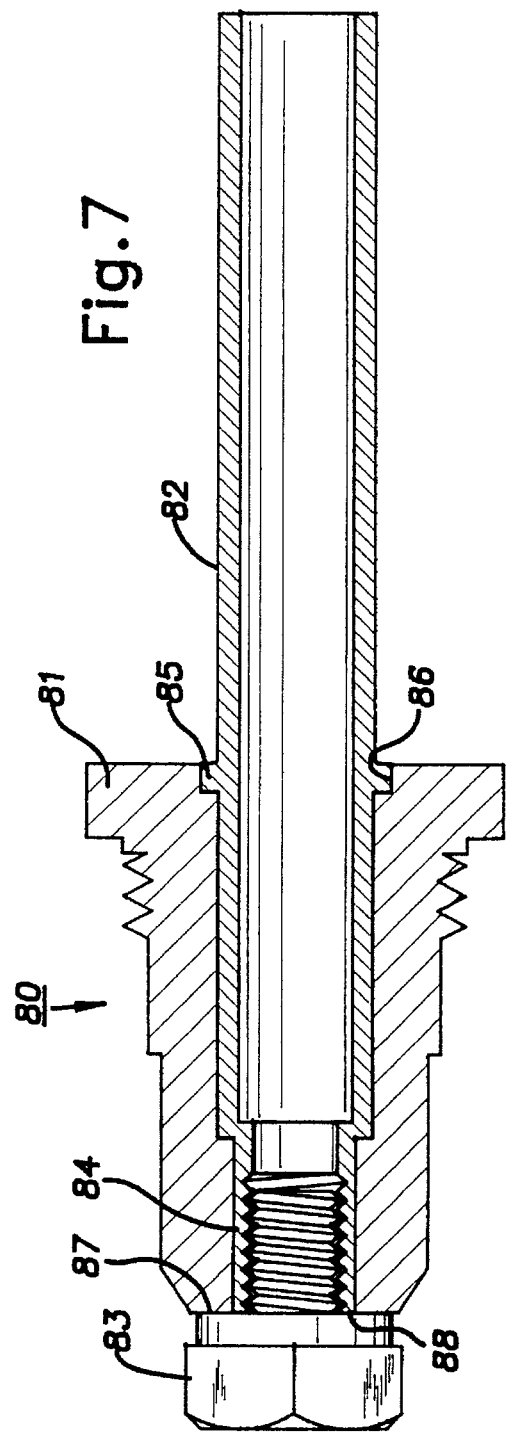

MEMBER AND TUBE ASSEMBLY

BACKGROUND OF THE INVENTION

Tube and fitting assemblies have been constructed in many variations. Some have been for hose couplings where a main problem is the high ductility and flexibility of the hose, such as in U.S. Pat. No. 2,447,900. Many have been a multi-part assembly such as a threaded nut and fitting to secure a tube to a fitting and to seal the tube to the fitting and then separately some other second member must be sealed to the fitting. This type is embodied in U.S. Pat. Nos. 2,463,883; 2,545,168. U.S. Pat. No. 3,497,946 relies on three separate operations to expand and contract a tube. U.S. Pat. No. 3,778,090 uses two separate mandrels to expand a tube for sealing with a gasket. U.S. Pat. No. 3,930,298 utilizes longitudinal compression of a tube to seal against a fitting. U.S. Pat. No. 4,076,280 utilizes an expanding tool to expand an end of a conduit inside a fitting having a sharp shoulder to bite into the conduit, and another conduit threads into the fitting. U.S. Pat. No. 4,453,301 teaches how to expand a tube into a header with a sealant therebetween. U.S. Pat. No. 4,669,761 utilizes an expander 30 to expand a tube into sealing engagement with a fitting 14 which then must have a seal at 16 with a mating part. U.S. Pat. No. 4,765,661 teaches a longitudinal compression of a pipe 6 into a fitting tube, and a threaded nut on the fitting holds a second pipe with a seal at a gasket 14. U.S. Pat. No. 4,805,945 has a fitting with a recess and teaches a four-part fitting with a mandrel expanding the tube inside a first fitting.

SUMMARY OF THE INVENTION

Many of the prior art structures have the defect of having several different places at which a fitting and tube assembly may leak. Consequently, each of these places must make a seal before the fitting and tube assembly is fluid-tight. The present invention avoids this defect by utilizing a tube and fitting assembly which comprises a fitting having first and second ends and an internal bore extending through the fitting from end-to-end, a tube closely engaging the bore and extending through the bore from end to end and being longitudinally compressed to be radially expanded into tight engagement with the bore of the fitting and with a shoulder in the fitting bore, an internal thread in one of the tube and fitting, and a second member threaded into the threads and sealed against the tube.

The present invention is also directed to a method of making a tube and fitting assembly which comprises the steps of providing a fitting having first and second ends, establishing an internal bore extending through the fitting from end-to-end, relatively moving a tube into said internal bore, longitudinally compressing the tube to radially expand it into engagement with the wall of said internal bore, threading internally one of said tube and fitting, and the threads adapted to receive a second member until sealed against the tube wherefore there is no need for a fluid-tight seal between the tube and fitting.

Accordingly, an object of the invention is to provide a method of making a tube and fitting assembly wherein the tube is longitudinally compressed to be radially expanded and then a second member engages internal threads in the tube or in the fitting to seal against the tube rather than seal against the fitting.

Other objects and a fuller understanding of the invention may be had by referring to the following description and claims, taken in conjunction with the accompanying drawing.

BRIEF DESCRIPTION OF THE DRAWINGS

FIG. 1 is a longitudinal sectional view of a completed tube and fitting assembly;

FIG. 2 is a longitudinal sectional view of the start of a method for making the assembly;

FIG. 3 is a longitudinal sectional view of a completion of the tube assembled into the fitting;

FIG. 4 is a longitudinal sectional view of a variation of the tube and fitting assembly;

FIG. 5 is a longitudinal sectional view of another embodiment of the invention;

FIG. 6 is a longitudinal sectional view of a still further embodiment; and

FIG. 7 is a longitudinal sectional view of another embodiment of the invention.

DESCRIPTION OF THE PREFERRED EMBODIMENTS

FIGS. 2, 3 and 1 show the steps in producing a tube and fitting assembly 10 illustrated and completed in FIG. 1. This includes a first fitting 11, a tube 12 and a second fitting or second member 13. In FIG. 1 this second member is an orifice fitting having a small internal orifice 14 and one use for this assembly 10 is as a pilot light assembly for a gas pilot light. The orifice fitting 13 may simply be changed to one of a different size orifice in order to change from natural gas to LP gas. The assembly 10 is supported on a sheet metal support 15 and secured by a nut 16.

FIG. 2 illustrates jaws 20 and 21 which grip the tube 12 at a predetermined distance from the end 22 of the tube. The fitting 11 is held by jaws 23 and 24 and an anvil 25 is held against an end 26 of the fitting 11. The fitting is provided with an internal bore 29 which extends from the end 26 to the opposite end 30 of the fitting 11. This internal bore is also provided with an enlarged bore or recess 31 at the end 30 with a shoulder 32 between the recess 31 and the internal bore 29. In this embodiment, there is also a flared opening 33 at the end 26 of the fitting. Preferably the anvil 25 has a conical extension 34 which fits into the flared opening 33 of the fitting.

The jaws 20, 21 and 23, 24 are relatively moved toward each other so that the tube 12 enters the internal bore 29. When the end 22 of the tube strikes the conical extension 34, it expands this end of the tube into a flared end of about a 45 degree angle. When the end of the tube strikes the anvil 25, this stops the forward relative movement of the end of the tube and it radially expands into tight engagement with the wall of the internal bore 29 and also radially expands into tight engagement with the recess 31 and shoulder 32. This secures the tube in the fitting 11 for support of the tube from the fitting. Also as shown in FIG. 1, the fitting is supported from the sheet metal support 15.

Next the tube 12 near the end 22 is internally threaded at 37. These threads are adapted to receive the threaded second member 13, and a seal is made between the second member 13 and the tube 12 at a conical portion 38 between a head 39 of the second member 13 and external threads 40 on the second member 13. In this manner there is a fluid-tight seal between the second member 13 and the tube 12 itself without relying upon any multiple seals such as a seal between the tube 12 and fitting 11 and another seal between the fitting 11 and the second member 13. Actually, the longitudinal compression of the tube 12 to expand it into the wall of the internal bore 29 and the recess 31 can be relied upon to make a fluid-tight seal between the tube 12 and the fitting 11, however, in this invention this seal is not required.

FIG. 4 shows a second embodiment of an assembly 41 of a tube 42, a fitting 43 and a second member 44. The tube 42 has been staked to the fitting 43 by a ring stake 45. An expanding mandrel has been used to longitudinally compress and radially expand the tube 42 into engagement with an internal recess 46 and a shoulder 47, and then the enlarged end 48 of the tube has been internally threaded at 49 to receive the second member 44. In this case, the fluid-tight seal is between a shoulder 50 on the member 44 and the outer end 51 of the tube 42. Since the fluid-tight seal is between the second member 44 and the tube 42, there is no need for a fluid-tight seal between the tube 42 and the fitting 43. FIG. 5 shows another embodiment of a tube and fitting assembly 60 with a fitting 61, a tube 62 and a second fitting 63. The method of assembly may be similar to that of FIGS. 1, 2 and 3 with the tube 62 longitudinally compressed to be radially expanded to engage the wall of the internal bore of the fitting 61 and to substantially fill the recess 64. A difference from FIG. 1 is that the internal threads 65 are in the fitting 61 rather than in the tube 62. Again, the seal is made between a conical flare 66 on the tube and a conical portion 67 on the second fitting 63. Again, with this construction there is no need for a fluid-tight seal between the tube 62 and the fitting 61 and instead the fluid-tight seal is between the tube 62 and the second fitting 63.

FIG. 6 shows a further embodiment of the invention with an assembly 70 which includes a fitting 71, a tube 72 and a second fitting 73. The tube 72 again has been longitudinally compressed to be radially expanded so that a bulge 74 of the tube fills the recess 75, also a mandrel has been used during longitudinal compression of the tube in order to radially expand it into an enlarged recess 76 at the other end of the fitting. The tube is again internally threaded at 77 to receive the threaded second fitting 73 and a seal is made between a shoulder 78 on the second fitting 73 and a right angle flange 79 on the end of the tube 72. Again, there is no need for a fluid-tight seal between the tube 72 and the fitting 71.

FIG. 7 shows a still further embodiment of an assembly 80 which has a fitting 81, a tube 82 and a second fitting 83. The construction is similar to FIG. 6 except that the tube has a reduced end 84 rather than an expanded end. The left end of the tube may first be reduced in diameter by any suitable machining step and then the tube is inserted into the fitting and longitudinally compressed to be radially expanded to engage the internal wall of the fitting 81 and to create the bulge 85 to fit in the recess 86 of the fitting. The reduced diameter end of the tube is then internally threaded to receive the threaded second fitting 83. The fluid-tight seal is between a shoulder 87 on the second fitting and the end 88 of the tube 82. Again, there is no need for any fluid-tight seal between the tube 82 and the fitting 81.

The various constructions show internal threads on either the fitting or on the tube itself to receive a second fitting with a fluid-tight seal between this second fitting and the tube. The tube has been longitudinally compressed to be radially expanded to engage the main fitting 11, 43, 61, 71 or 81 to physically support the tube in a positive manner.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tube and fitting assembly comprising a fitting having first and second ends and an internal bore extending through the fitting from end-to-end;

a shoulder in said fitting bore;

a tube closely engaging the bore and extending at least partially through the bore and being longitudinally compressed to be radially expanded into tight engagement with the bore of the fitting and with said shoulder;

an internal thread in one of said tube and fitting; and a second member threaded into said threads and sealed against said tube.

2. The assembly as set forth in claim 1, wherein said internal thread is in said fitting.

3. The assembly as set forth in claim 1, wherein said internal thread is in said tube.

4. The assembly as set forth in claim 3, wherein the internally threaded portion of the tube is an expanded portion.

5. The assembly as set forth in claim 3, wherein the internally threaded portion of the tube is a reduced diameter portion.

6. The assembly as set forth in claim 3, wherein an end of the tube is conically flared, and the second member makes a fluid-tight seal at said flare.

7. The assembly as set forth in claim 6, wherein the flared end of the tube is at an end of the fitting.

8. The assembly as set forth in claim 1, wherein said second member is an orifice fitting having a longitudinal orifice smaller than the inside diameter of said tube.

9. The assembly as set forth in claim 1, including an enlarged recess in said internal bore;

said shoulder being formed by said enlarged recess; and said radial expansion of the tube at least partially filling said recess and engaging said shoulder.

10. The assembly as set forth in claim 1, wherein the end of the tube is flared intermediate the length of the internal bore.

\* \* \* \* \*